US012756284B2

(12) United States Patent
Häßler et al.

(10) Patent No.: US 12,756,284 B2
(45) Date of Patent: Oct. 6, 2026

(54) ELECTRIC MACHINE

(71) Applicant: Schaeffler Technologies AG & Co. KG, Herzogenaurach (DE)

(72) Inventors: Martin Häßler, Graben-Neudorf (DE); Alain Rusch, Gambsheim (FR); Miriam Axtmann, Marxzell (DE); Michael Kessler, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 81 days.

(21) Appl. No.: 18/849,573

(22) PCT Filed: Mar. 15, 2023

(86) PCT No.: PCT/DE2023/100198

§ 371 (c)(1),
(2) Date: Sep. 23, 2024

(87) PCT Pub. No.: WO2023/179814

PCT Pub. Date: Sep. 28, 2023

(65) Prior Publication Data

US 2025/0202327 A1 Jun. 19, 2025

(30) Foreign Application Priority Data

Mar. 24, 2022 (DE) ..................... 10 2022 106 945.1

(51) Int. Cl.
*H02K 21/02* (2006.01)
*H02K 1/276* (2022.01)

(52) U.S. Cl.
CPC ........... *H02K 21/023* (2013.01); *H02K 1/276* (2013.01); *H02K 2213/09* (2013.01)

(58) Field of Classification Search
CPC .. H02K 2213/09; H02K 1/2766; H02K 1/276; H02K 21/025; H02K 21/024; H02K 21/023

(Continued)

(56) References Cited

U.S. PATENT DOCUMENTS

| | | | | |
|---|---|---|---|---|
| 5,821,710 | A | 10/1998 | Masuzawa et al. | |
| 2026/0106527 | A1 * | 4/2026 | Häßler | H02K 21/024 |

FOREIGN PATENT DOCUMENTS

| | | | |
|---|---|---|---|
| CN | 104600929 | A | 5/2015 |
| CN | 105449969 | A | 3/2016 |

(Continued)

OTHER PUBLICATIONS

Notice of Allowance Corresponding to Korean Patent Application No. 10-2024-7029894, dated Dec. 29, 2025.

*Primary Examiner* — Terrance L Kenerly

(57) ABSTRACT

An electric machine has a stator and a rotor which is separated from the stator by an air gap. The rotor has at least one first rotor body, which has a first group of permanent magnets, and at least one second rotor body, which is arranged at an axial distance from the first rotor body) and has a second group of permanent magnets. A rotor shaft is coupled to the first rotor body and the second rotor coaxially within the first rotor body and the second rotor body so as to transmit a torque. At least the first rotor body is mounted on the rotor shaft so as to be rotatable relative to the second rotor body against the effect of a first torsional stiffness by means of a mechanical field-attenuation mechanism.

11 Claims, 14 Drawing Sheets

(58) Field of Classification Search
USPC ..................................................... 310/156.07
See application file for complete search history.

(56) References Cited

FOREIGN PATENT DOCUMENTS

| | | | |
|---|---|---|---|
| DE | 3317553 | A1 | 11/1984 |
| DE | 1867030 | B1 | 3/2014 |
| DE | 102016103470 | A1 | 8/2017 |
| DE | 102017108670 | A1 | 10/2018 |
| DE | 102018127360 | A1 | 5/2019 |
| DE | 102021101904 | B3 | 5/2022 |
| DE | 102021101898 | A1 | 7/2022 |
| DE | 102022106944 | A1 | 9/2023 |
| EP | 1085644 | A1 | 3/2001 |
| FR | 2831345 | A1 | 4/2003 |
| WO | 2006105839 | A1 | 10/2006 |

* cited by examiner

ELECTRIC MACHINE

CROSS-REFERENCE TO RELATED APPLICATIONS

This application is the U.S. National Phase of PCT Appln. No. PCT/DE2023/100198 filed Mar. 15, 2023, which claims priority to DE 10 2022 106 945.1 filed Mar. 24, 2022, the entire disclosures of which are incorporated by reference herein.

TECHNICAL FIELD

The present disclosure relates to an electric machine, in particular for use within a drive train of a hybrid or fully electric motor vehicle, comprising a stator and a rotor separated from the stator by an air gap, wherein the rotor comprises at least a first rotor body having a first group of permanent magnets and at least one second rotor body axially spaced apart from the first rotor body with a second group of permanent magnets, and coaxially within the first rotor body and the second rotor body, a rotor shaft is coupled to the first rotor body and the second rotor body in a torque-transmitting manner, wherein at least the first rotor body is rotatably mounted on the rotor shaft by means of a mechanical field-attenuation mechanism against the effect of a first torsional stiffness relative to the second rotor body.

BACKGROUND

Electric machines are subject to losses during operation due to magnetic reversal, which are grouped together as iron losses and reduce the machine efficiency. In mobile applications, low efficiency of the electric machine means a reduced range of the vehicle or increased demand for battery capacity. It is therefore an ongoing goal, especially in mobile applications with purely electric drive, to minimize the iron losses described.

An example of such an electric machine with iron losses, as it can be used within a drive train of a hybrid or fully electrically powered motor vehicle, is what is termed the permanently excited synchronous machine. Due to its high power density compared to other types of machines, it is preferred for use in the field of electromobility, where the available installation space is often a limiting factor. The excitation field of the machine is usually generated by permanent magnets that are arranged in the rotor of the machine. In a permanently excited synchronous machine, it is possible to dispense with a slipring contact which is necessary in electrically excited synchronous machines to supply power to an excitation coil arranged on the rotor.

However, a disadvantage of permanent excitation is that the excitation field cannot be easily modified. In principle, a synchronous machine can be operated beyond its rated speed by controlling what is termed the field-attenuation range. In this range, the machine is operated at its maximum rated power, with the torque delivered by the machine decreasing as the speed increases. Electrically excited synchronous machines can be operated very easily in the field-attenuation range by reducing the excitation current. Even in the case of permanent magnet machines, there are known ways of generating an air gap field component by means of a suitable current supply to the stator of the machine, which counteracts the excitation field generated by the permanent magnets and thus weakens it. However, such control of the machine causes increased losses, so that the machine can only be operated with a reduced efficiency in this range.

An effective method for reducing iron losses in electrical machines is to deliberately weaken the magnetic field between stator and rotor for operating points with high speeds, since the losses due to high-frequency magnetic reversal are lower with a weaker magnetic field. In addition to electrical, there are also mechanical approaches for targeted field attenuation. From the patent specifications U.S. Pat. No. 5,821,710, FR28131345, EP1085644, EP1867030, DE10401708670, DE104016103470, CN104600929 and CN105449969, a rotor of a radial flux machine is known which is divided in a manner perpendicular to the axis of rotation into several rotor discs equipped with permanent magnets and which can be rotated relative to one another. Depending on the relative rotation between the rotor discs, the rotor provides the full magnetic field in a position with the magnetic poles aligned in the axial direction and a weakened magnetic field in a position rotated relative to this. Active or passive mechanisms are described which claim to be able to switch between these two positions depending on the rotor speed or torque and thus enable more efficient operation of the electric machine over the entire engine characteristic map.

DE 10 4021 101 898 describes an arrangement in which the rotor of a radial flow machine is divided into two partial rotors, the individual rotor discs of which alternate in the axial direction. One part of the rotor is directly connected to the rotor shaft, the other part is connected to the rotor shaft in a torque-transmitting manner via a torsional stiffness. The torsional stiffness is selected in such a way that at low torque the partial rotors are in a torsional position with a weakened magnetic field and at high torque the partial rotors are in a torsional position with a full magnetic field. DE 10 4021 101 904 claims a structurally designed mechanical module that can be introduced into the interior of the permanent magnet-equipped rotor discs, creates the described connections of the partial rotors to the rotor shaft, and allows a movement characteristic to be defined via the torsional stiffness, which is implemented with springs and roller-equipped cam drives.

All previously mentioned passive solutions, which use a moment as a sensor variable to trigger a relative rotation between two partial rotors against a torsional stiffness, assume that the total electromagnetic moment generated by the stator current supply in the case of the initially field-weakened position with non-aligned magnetic poles is simply distributed between the two partial rotors, approximately according to their share of the total length and according to their respective phase position to the stator field, regardless of the presence of the other partial rotor. Only then could a partial torque proportional to the total torque be easily directed against a torsional stiffness between the partial rotors or one of the partial rotors and the rotor shaft and bring about the desired rotation with increasing torque into the position with full magnetic field with aligned magnetic poles. However, tests and modeling by the applicant have shown that the actual situation is far more complicated.

Even in the de-energized case, there are interactions between the rotor discs of the two sub-rotors in the form of magnetic repulsion moments. The position with full magnetic field and aligned magnetic poles represents a labile equilibrium with vanishing repulsion moment. As the rotation begins from this equilibrium position, a repulsion moment arises which increases with increasing rotation until it reaches a maximum and then decreases again with further rotation. The course of the repulsion torque over the angle of rotation within an electrical period, the height of the maximum, and the angle of rotation at which it occurs depend strongly on the chosen type of arrangement of the permanent magnets within the rotor discs. The course over an electrical period is fundamentally nonlinear.

In the case of the desired efficient stator current supply for different speeds, these magnetic repulsion moments increase in different ways, sometimes several times, depending on the speed. Overall, partial moments result which are in no case suitable to be easily directed against a torsional stiffness between the partial rotors or one of the partial rotors and the rotor shaft to cause a rotation of the partial rotors into the position with full magnetic field, since they do not point in the right direction for this due to the high proportion of magnetic repulsion moments.

To represent a functional arrangement in the sense of the previously mentioned passive solutions for moment-adaptive field attenuation of the rotor of an electrical machine, it is the object of the present disclosure to provide an electrical machine with an improved mechanical field attenuation, which in particular also effectively converts the partial moments actually occurring on the rotor bodies for a desired movement and transfers them to the rotor shaft.

SUMMARY

This object is achieved by an electric machine, in particular for use within a drive train of a hybrid or fully electric motor vehicle, comprising a stator and a rotor separated from the stator by an air gap, wherein the rotor comprises at least a first rotor body with a first group of permanent magnets and at least one second rotor body axially spaced apart from the first rotor body with a second group of permanent magnets, and a rotor shaft is coupled coaxially within the first rotor body and the second rotor body to the first rotor body and the second rotor body in a torque-transmitting manner, wherein at least the first rotor body is rotatably mounted on the rotor shaft by means of a mechanical field-attenuation mechanism against the effect of a first torsional stiffness relative to the second rotor body, wherein the contours of the lever element in contact with the lever contact sections are designed such that in every operating position of the mechanical field-attenuation mechanism over its entire movement path in sections perpendicular to the axis of rotation of the rotor, all contact points between the rotor bodies and the lever element are on a straight connecting line between the tilting axis of the lever element and the rotational axis of the rotor.

This provides the advantage that an electrical machine can be realized with a purely mechanical field-attenuation device, which reliably and cost-effectively adjusts the positions of permanent magnets within the rotor required for field attenuation as required, depending on the operating conditions of torque and speed. In principle, the disclosure thus also avoids the need for actuators to intervene on or in the rotor from the outside.

An essential aspect of the proposed mechanical field attenuation is, among other things, the use of a lever at at least two circumferential locations within the rotor to transfer the partial moments of the two rotor bodies, e.g., to a rotor shaft, while simultaneously providing torsional stiffness between the rotor bodies.

In particular, a lever element can also be provided which has no or only very little slippage with correspondingly low friction at the contact points with the rotor bodies and the rotor shaft during the adjustment movement so that a practically negligible hysteresis can be expected during the movement of the mechanical field-attenuation mechanism and only very little wear on the components moving against each other.

The individual elements of the claimed subject matter of the disclosure will be explained herein, after which advantageous embodiments of the subject matter of the disclosure will be described.

The electric machine can in particular be designed as a rotary machine. In the case of electric machines designed as rotary machines, a distinction is drawn in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator. In the context of this disclosure, it is possible that the electric machine is configured as a radial flux machine or axial flux machine.

A rotor is the rotating (spinning) part of an electric machine. The rotor particularly comprises a rotor shaft and one or more rotor bodies formed of rotor plate assemblies which are arranged on the rotor shaft in a non-rotatable manner. The rotor shaft can be hollow, which on the one hand results in weight savings and on the other hand allows the supply of lubricant or coolant to the rotor body.

A rotor body for the purposes of the disclosure is understood to mean the rotor without a rotor shaft. The rotor body is therefore composed in particular of the laminated rotor core and the magnetic elements introduced into the pockets of the laminated rotor core or fixed circumferentially to the laminated rotor core, and any axial cover parts present for closing the pockets.

The permanent magnets can preferably be inserted into the pockets of the rotor core. A single larger rotor magnet designed as a bar magnet or a plurality of smaller permanent magnetic elements can be provided for each pocket.

The rotor preferably has a plurality of rotor bodies. Particularly preferably, the rotor bodies are formed essentially of the same parts, in particular essentially identically. It is highly preferred that the rotor bodies are formed from identical, in particular substantially identical rotor laminations. The rotor bodies are therefore particularly preferably formed from a rotor lamination package, which is composed of a plurality of laminated individual sheets or rotor laminations, usually made of electrical steel, which are layered and packaged one above the other to form a stack, what is termed the rotor lamination package. The individual sheets can be held together in the rotor plate package by gluing, welding, or screwing. A rotor lamination stack can in particular also have permanent magnets that are inserted into the pockets of the rotor lamination stack, or that are fixed circumferentially to the rotor lamination stack.

According to an advantageous embodiment of the disclosure, it can be provided that the torsional stiffness is designed as a spring element, in particular as a compression spring or arc spring, which have proven to be particularly suitable.

According to a further preferred development of the disclosure, it can also be provided that the lever element is received in a radially inwardly directed groove extending axially through the rotor shaft. In particular, this makes it possible to realize a pivoting bearing of the lever element in the rotor wool that is simple to manufacture.

Furthermore, according to a likewise advantageous embodiment of the disclosure, it can be provided that the groove is V-shaped, whereby a particularly low-friction pivoting of the lever element in the groove can be made possible.

According to a further, particularly preferred embodiment of the disclosure, it can be provided that the lever element comprises an ovoid base body which is positioned in the groove, which also contributes to a low-friction pivoting of the lever element in the groove.

Furthermore, the disclosure can also be further developed in such a way that arcuate claws extending radially outwards from the ovoid base body are formed for engagement with the radially outer lever contact sections. These claws can also provide a friction-optimized contact of the lever element with the rotor bodies.

In a likewise preferred embodiment variant of the disclosure, it can also be provided that the lever element is secured radially via a securing ring that can be rotated relative to and coaxially with the rotor. This allows for easy assembly and manufacture of the rotor and also ensures a safe and controlled pivoting movement of the lever element relative to the rotor shaft since the lever element can unintentionally move radially outwards under the influence of centrifugal force at high speeds because, for example, the radial components of the normal and friction forces at the contact points with the rotor discs are not sufficiently high to hold the lever element radially inward in its desired position.

It can also be advantageous to further develop the disclosure in such a way that the first rotor body consists of a plurality of rotor discs which are arranged in the axial direction alternating with rotor discs of the second rotor body, wherein the rotor discs of the first rotor body are connected to form a structural unit via first connecting means extending axially parallel to the axis of rotation of the rotor, and the rotor discs of the second rotor body are connected to form a structural unit via second connecting means extending axially parallel to the axis of rotation of the rotor. The advantage that can be realized in this way is that with increasing number of rotor discs for a given axial extension of the rotor, an increasingly uniform weakened field can be formed in the axial direction. Also, as the number of rotor discs increases, the number of contact surfaces between the rotor discs of the first and second group increases, which also contributes to an increasingly uniform weakened field.

According to a further preferred embodiment of the subject matter of the disclosure, it can be provided that a spacer sleeve is arranged between adjacent rotor discs of the first rotor body on the first connecting means, and a spacer sleeve is arranged between adjacent rotor discs of the second rotor body on the second connecting means. This makes it possible to ensure that the axial space between the adjacent rotor discs of one group can be kept free for engagement of the rotor discs of the other group when the rotor bodies are rotated against each other by the field-attenuation mechanism.

BRIEF DESCRIPTION OF THE DRAWINGS

Finally, the disclosure can also be advantageously designed such that stop teeth acting in the circumferential direction are formed between the rotor discs, the rotor body, and the rotor shaft, so that the respective rotary end positions of the mechanical field-attenuation mechanism are defined.

The disclosure is explained in more detail below with reference to drawings without limiting the general concept of the disclosure.

In the drawings:

FIG. 1 shows an electric machine in a sectional view,

Figure 2:
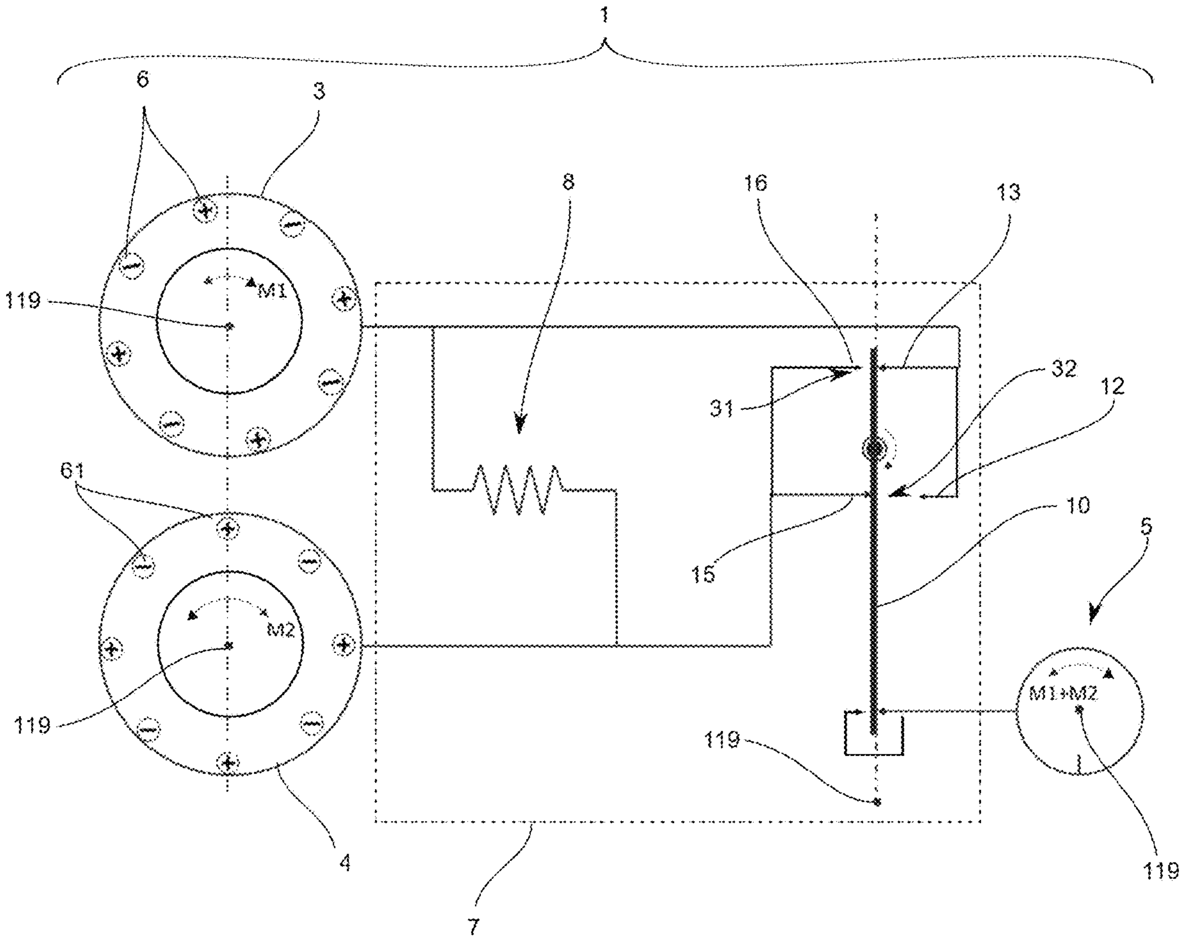
Figure 3:
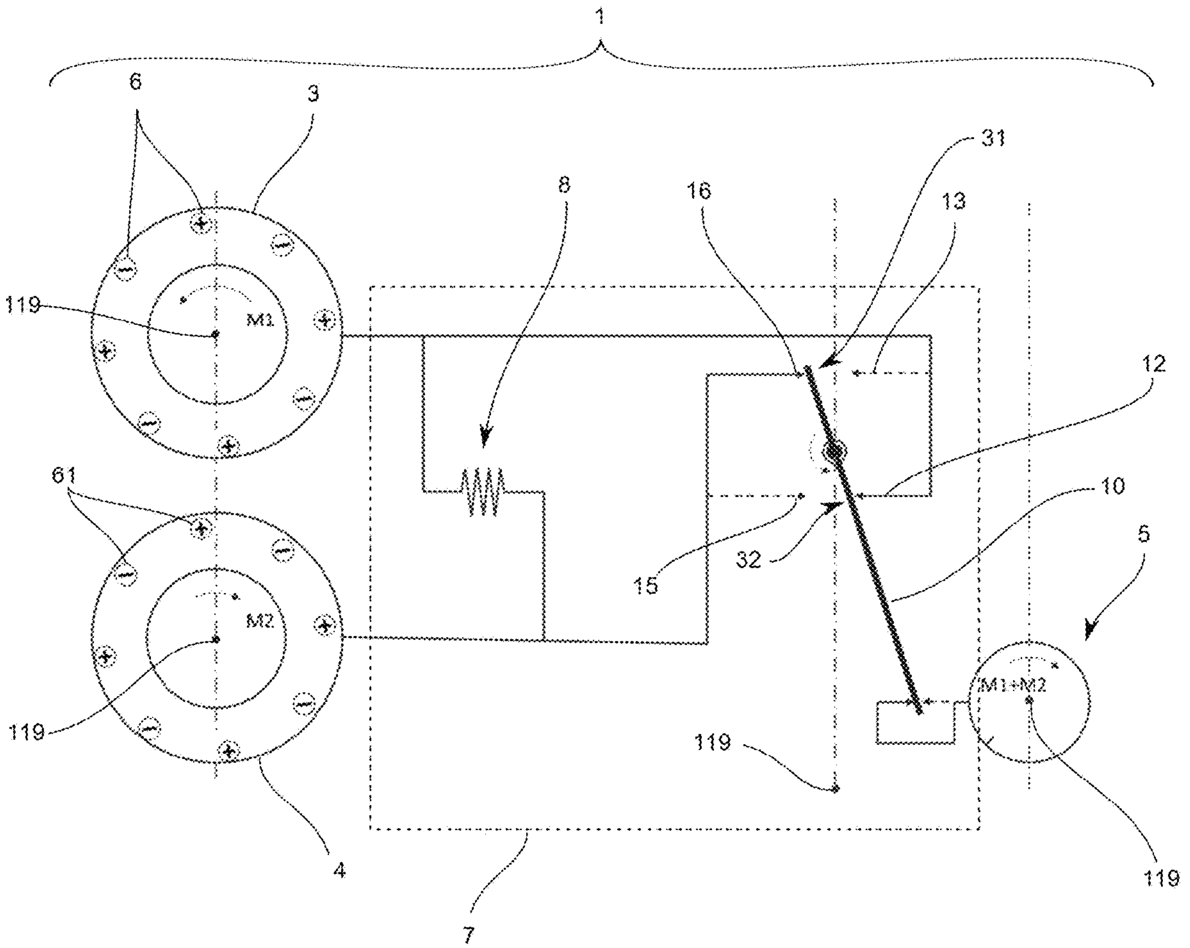
Figure 4:
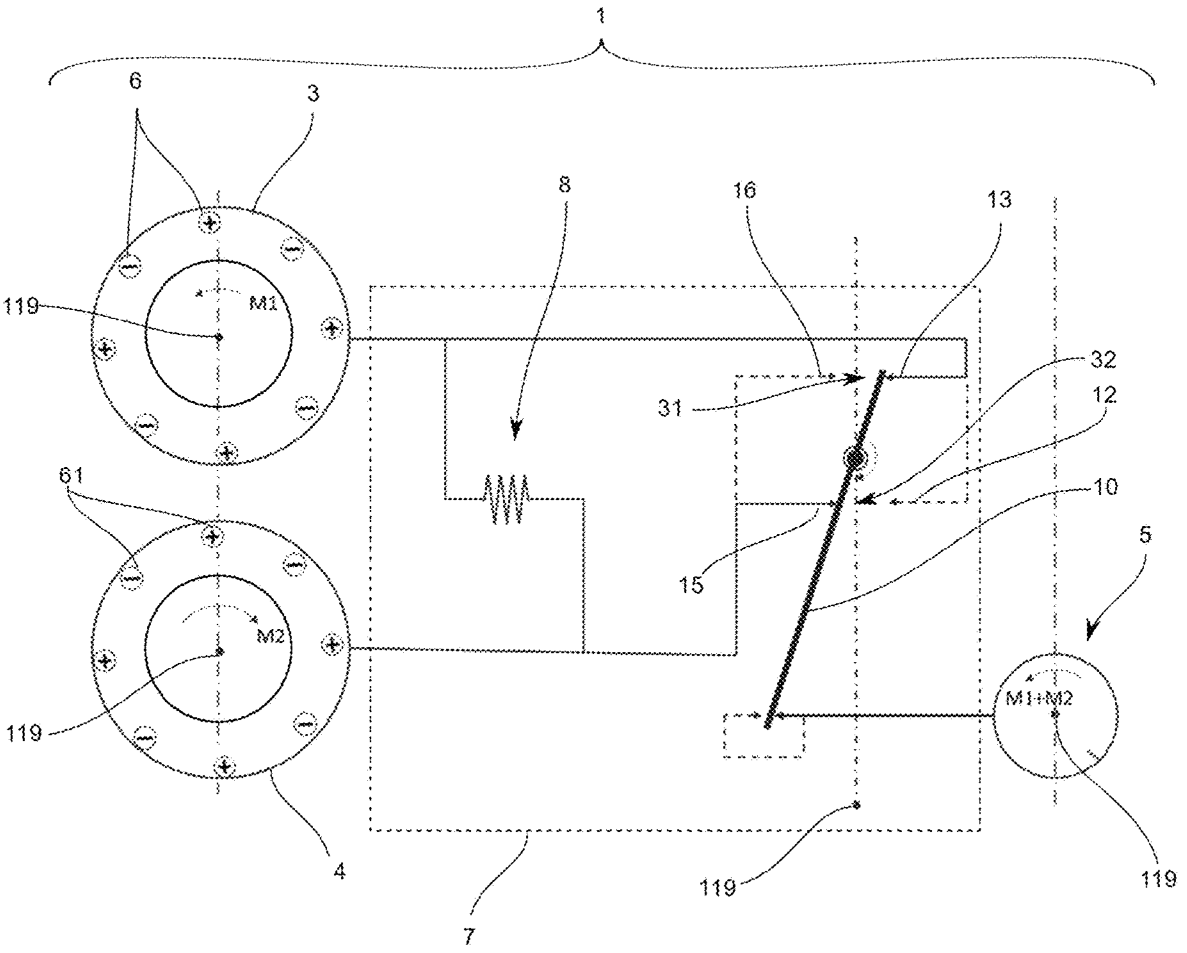
Figure 5:
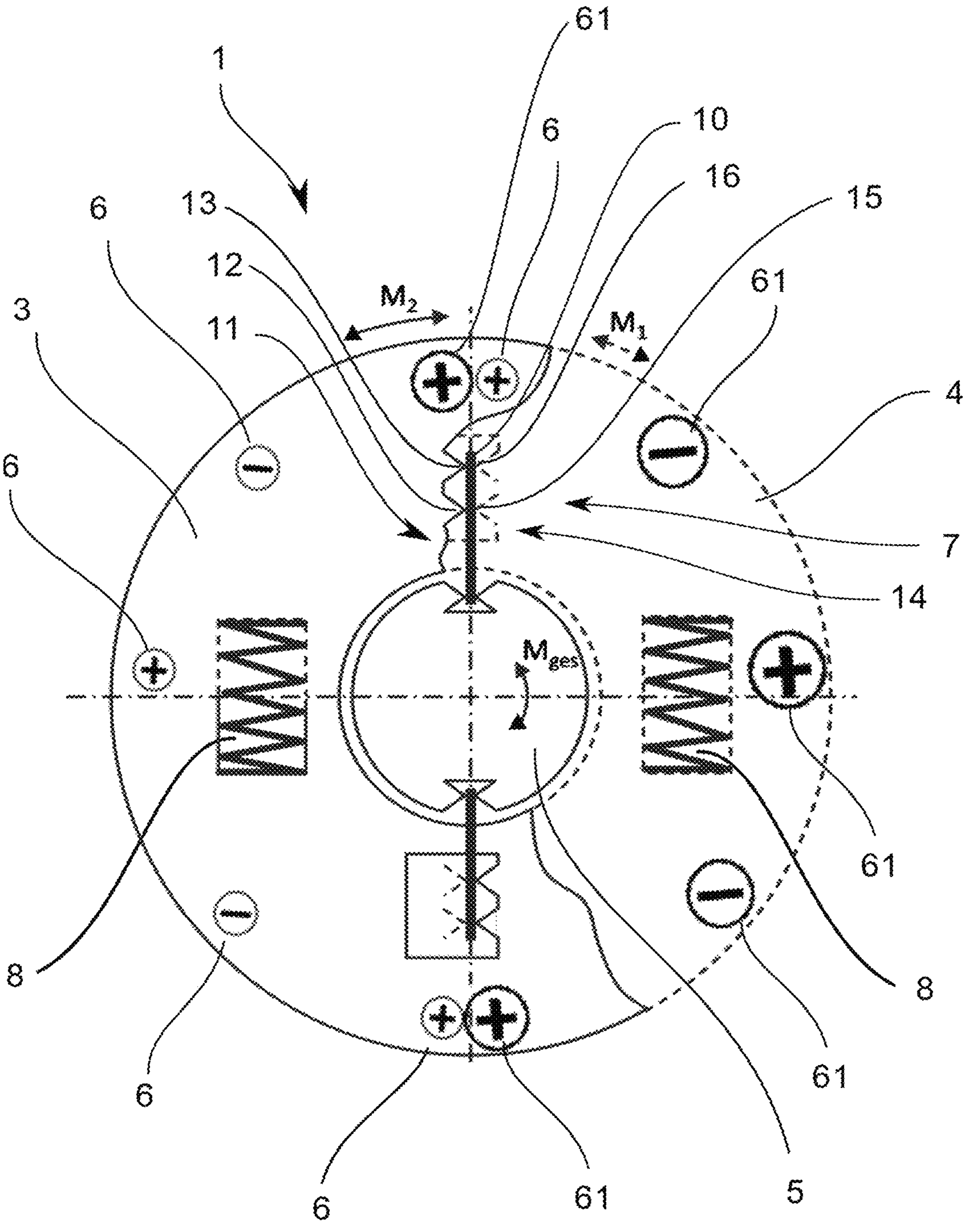
Figure 6:
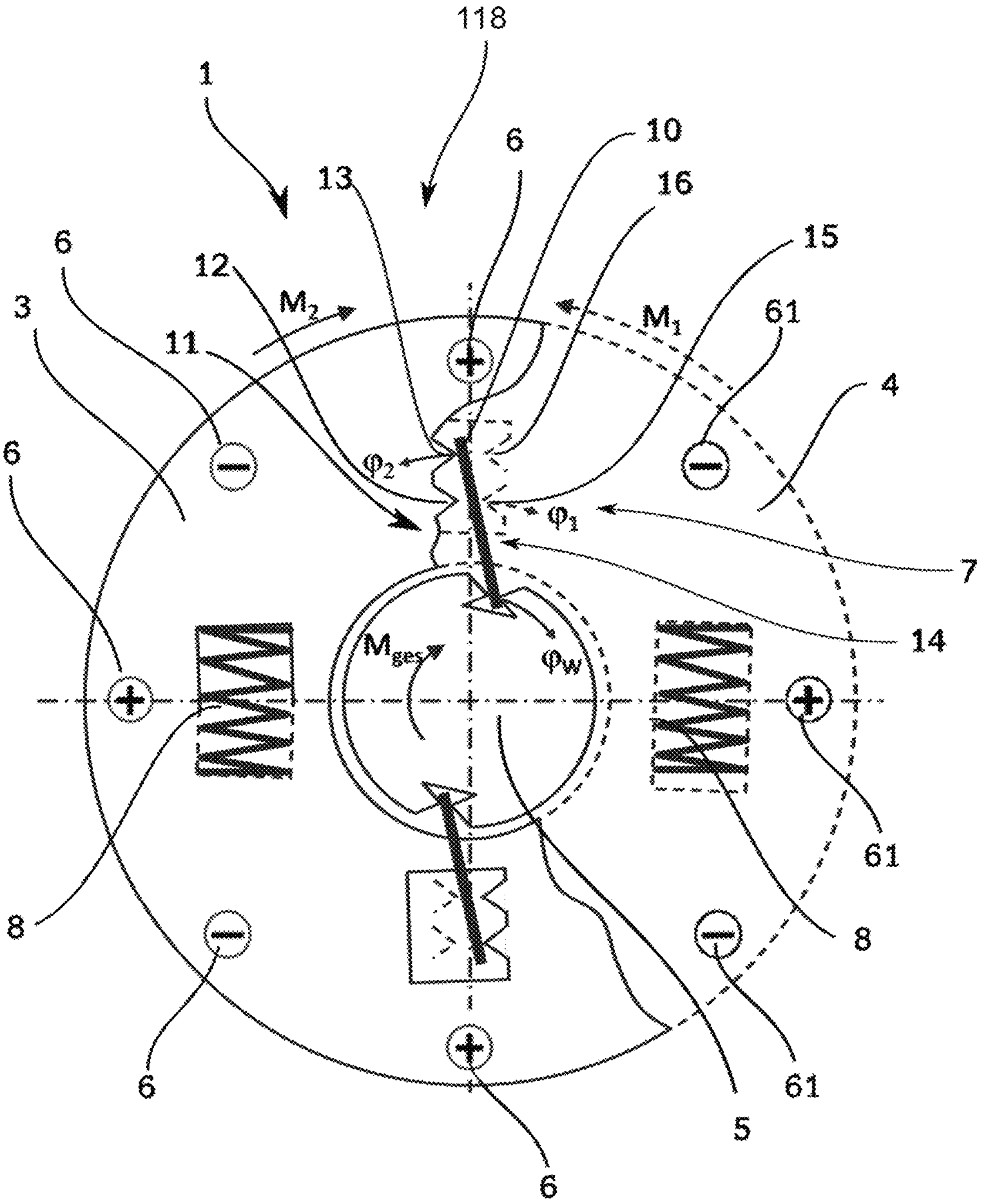
Figure 7:
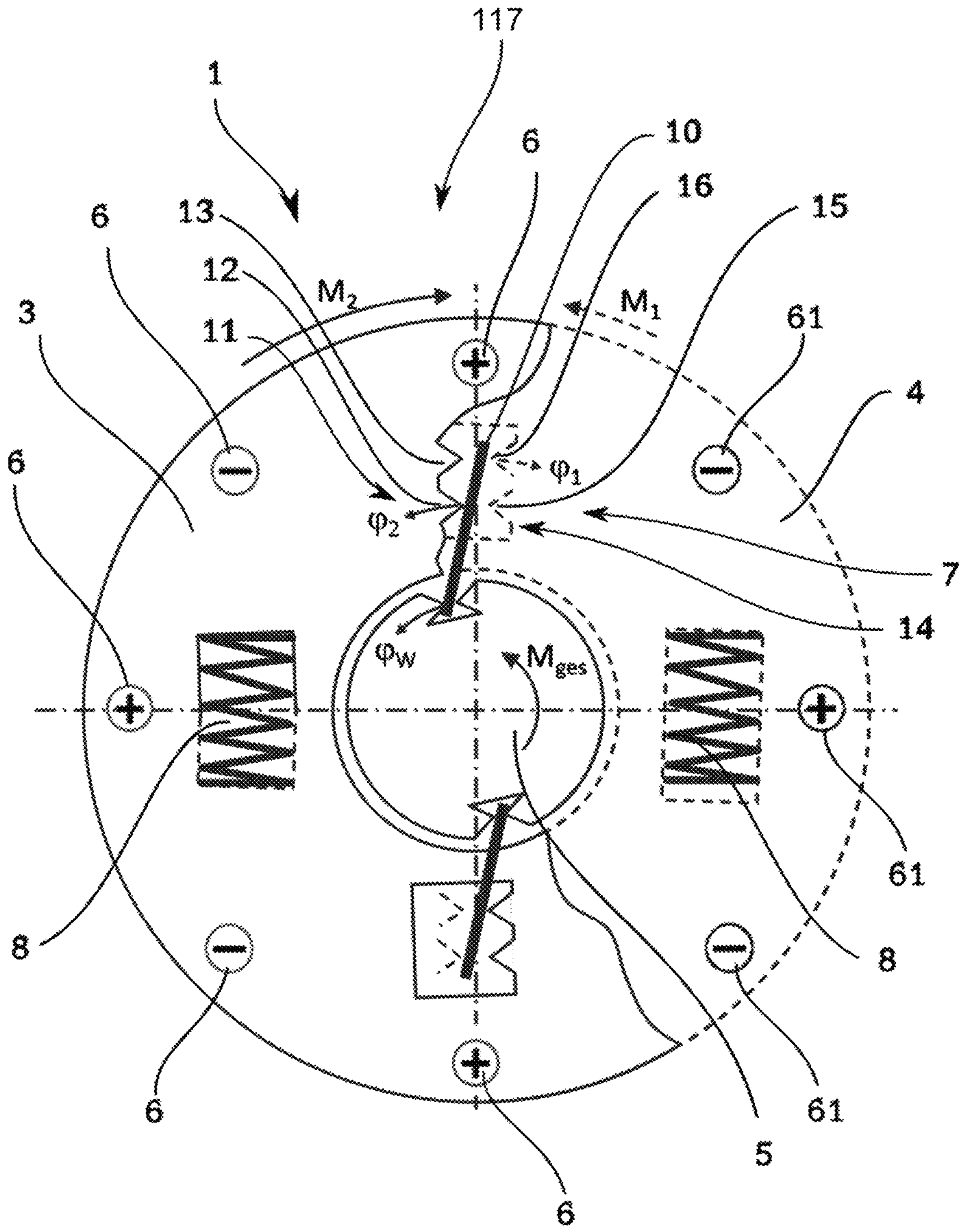

FIG. 2 shows a rotor with a mechanical field-attenuation mechanism in a neutral position in a schematic block diagram, FIG. 3 shows a rotor with a mechanical field-attenuation mechanism in a first operating position in a schematic block diagram, FIG. 4 shows a rotor with a mechanical field-attenuation mechanism in a second operating position in a schematic block diagram, FIG. 5 shows a rotor with a mechanical field-attenuation mechanism in a neutral position in a schematic cross-sectional view, FIG. 6 shows a rotor with a mechanical field-attenuation mechanism in a first operating position in a schematic cross-sectional view, FIG. 7 shows a rotor with a mechanical field-attenuation mechanism in a second operating position in a schematic cross-sectional view.

Figure 8:
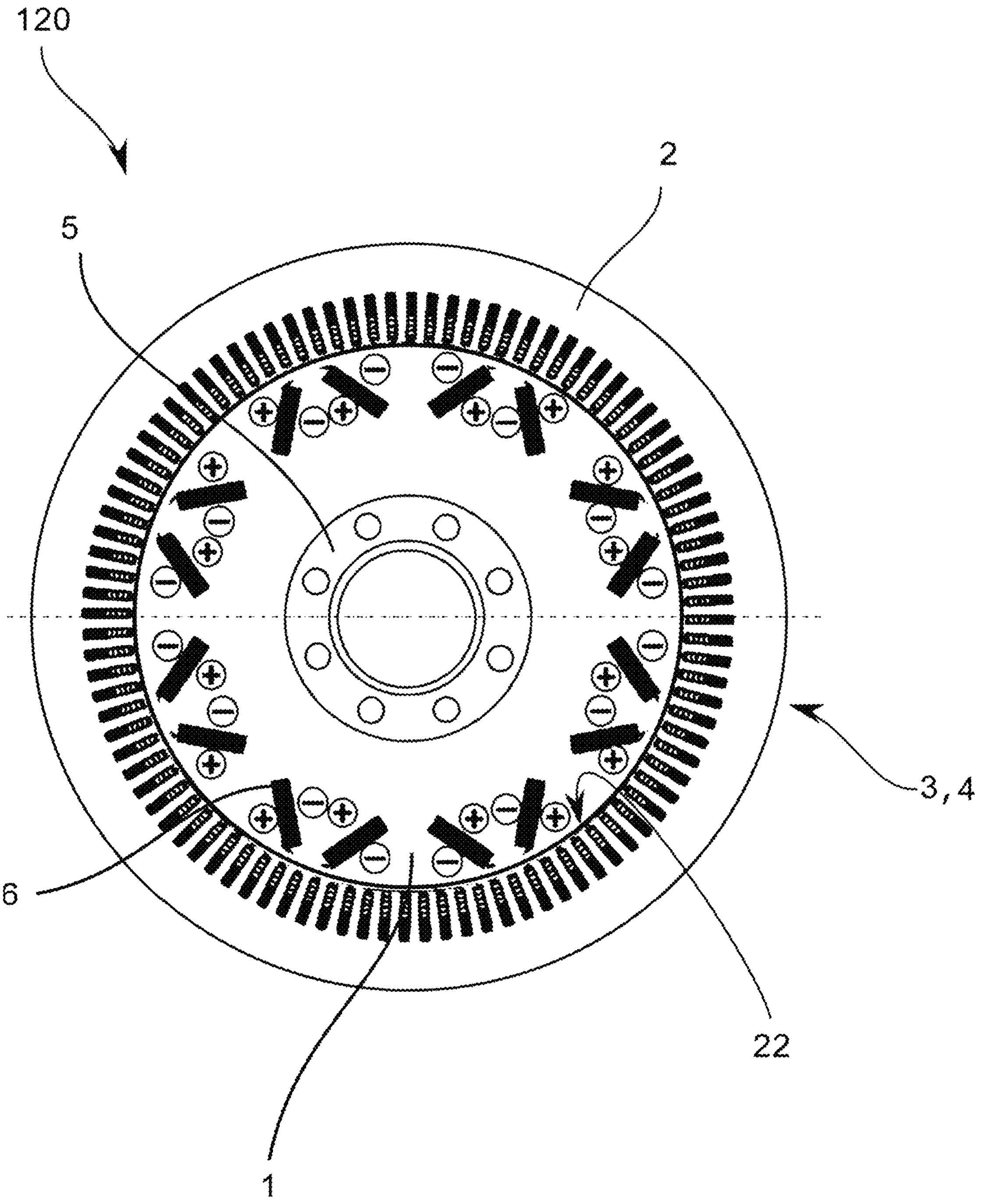
Figure 9:
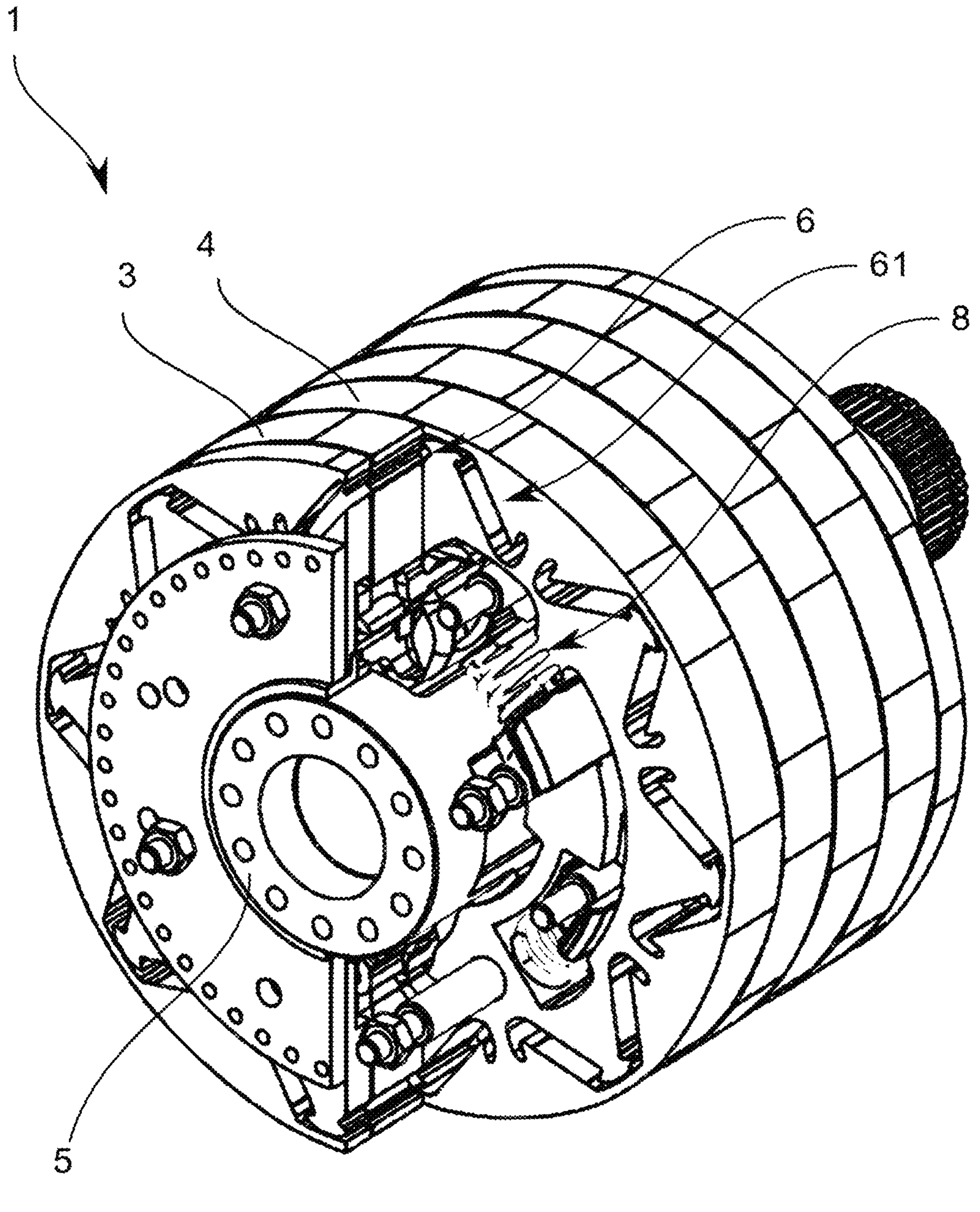
Figure 10:
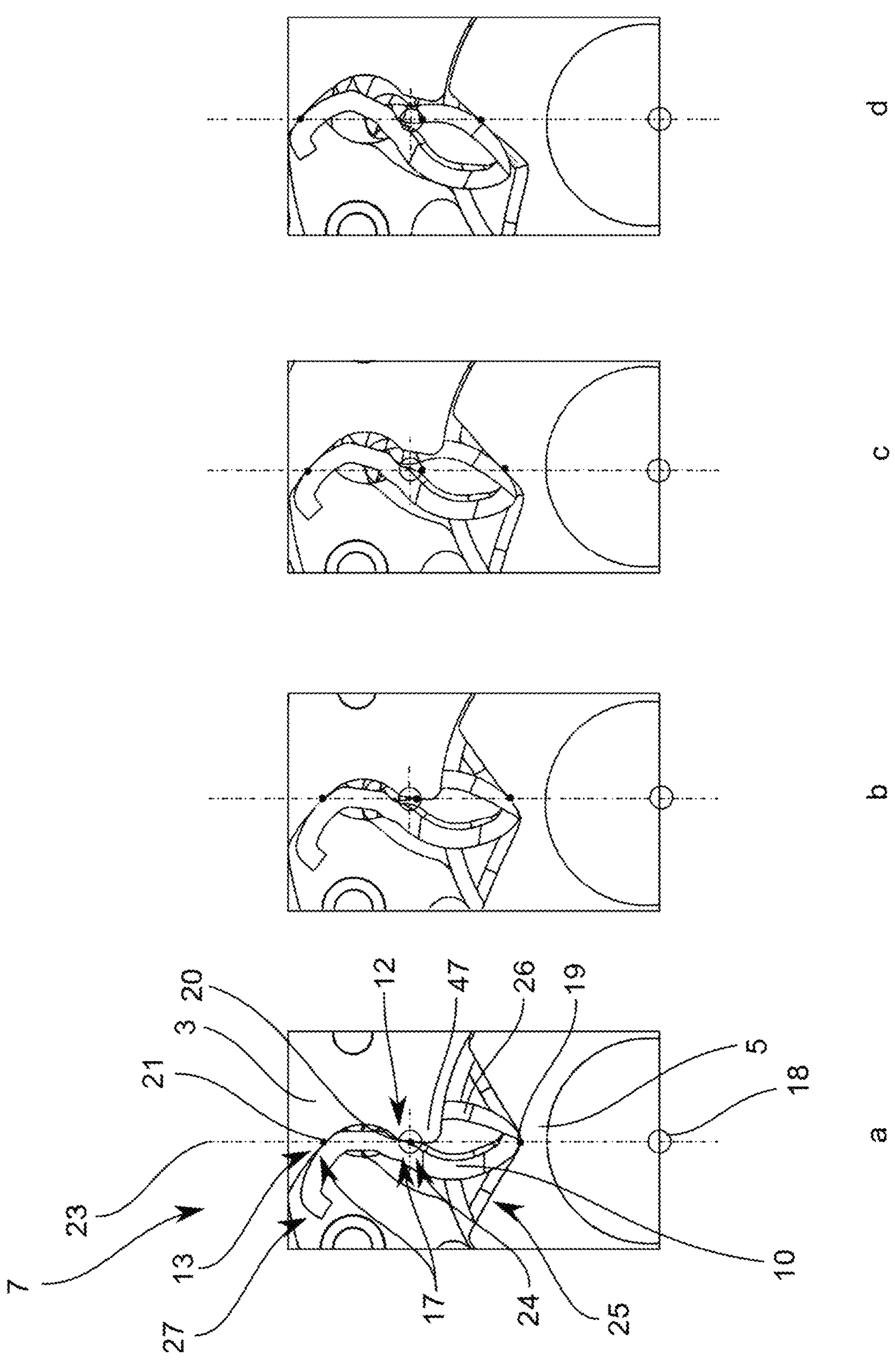
Figure 11:
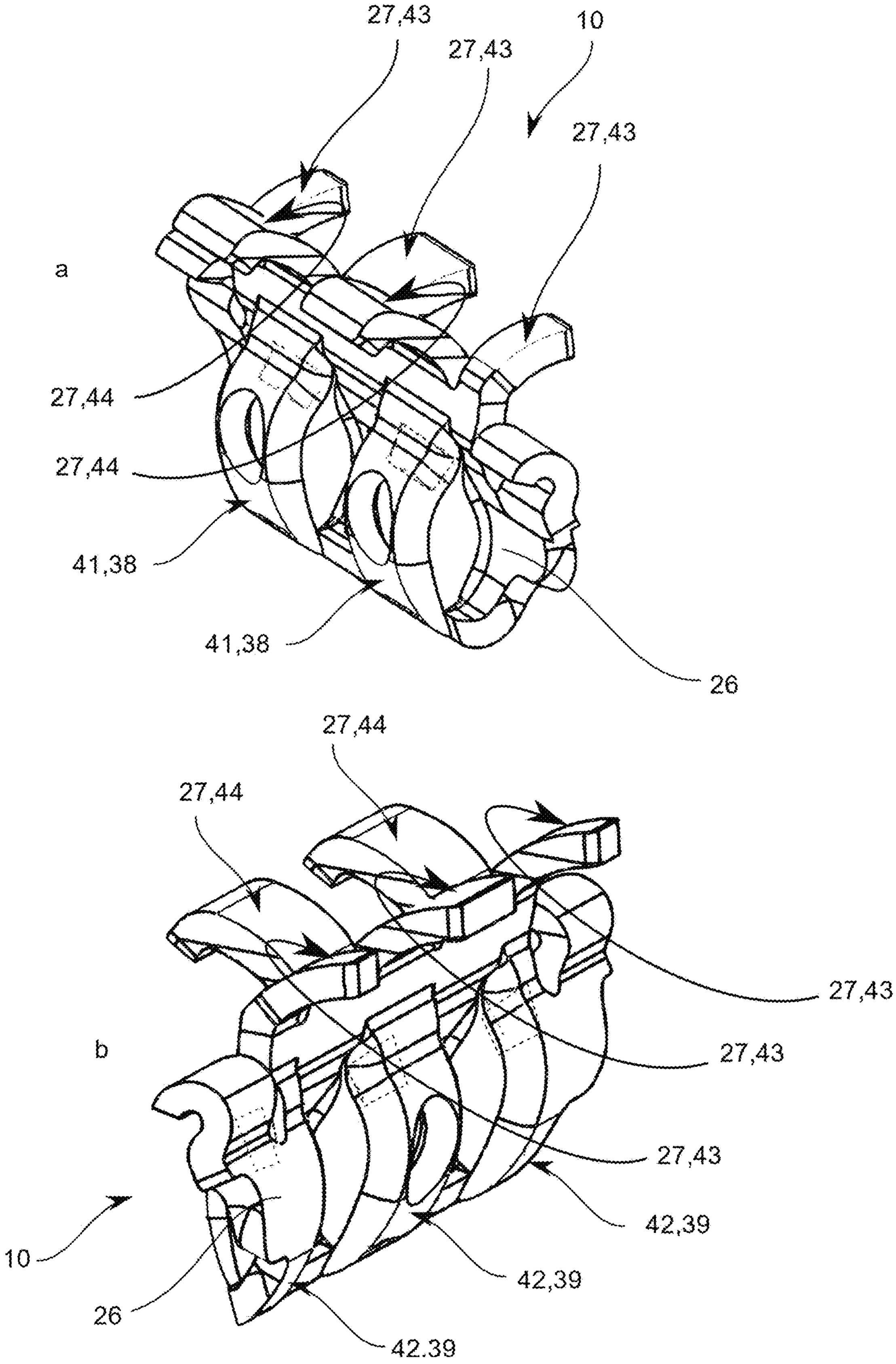
Figure 12:
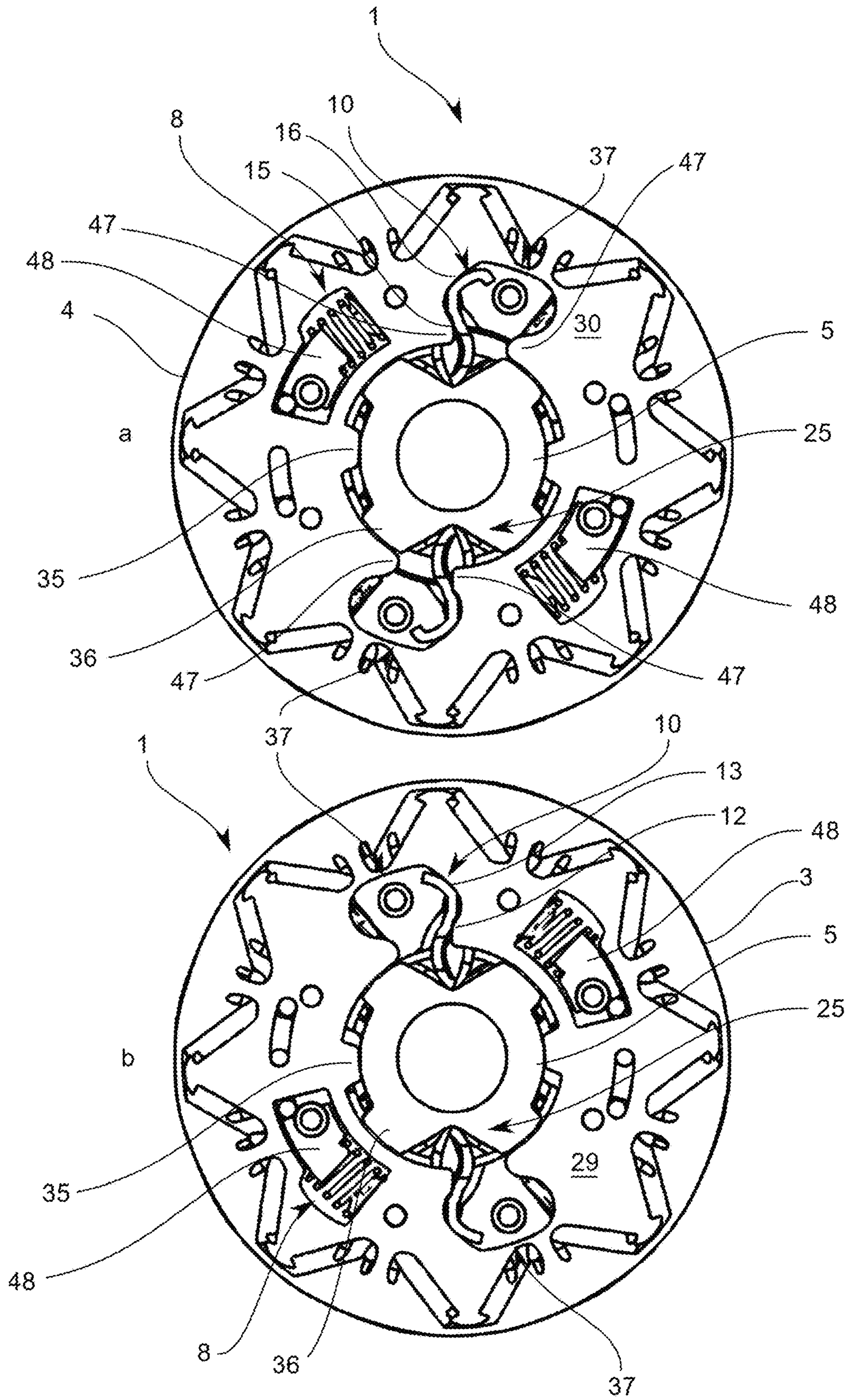
Figure 13:
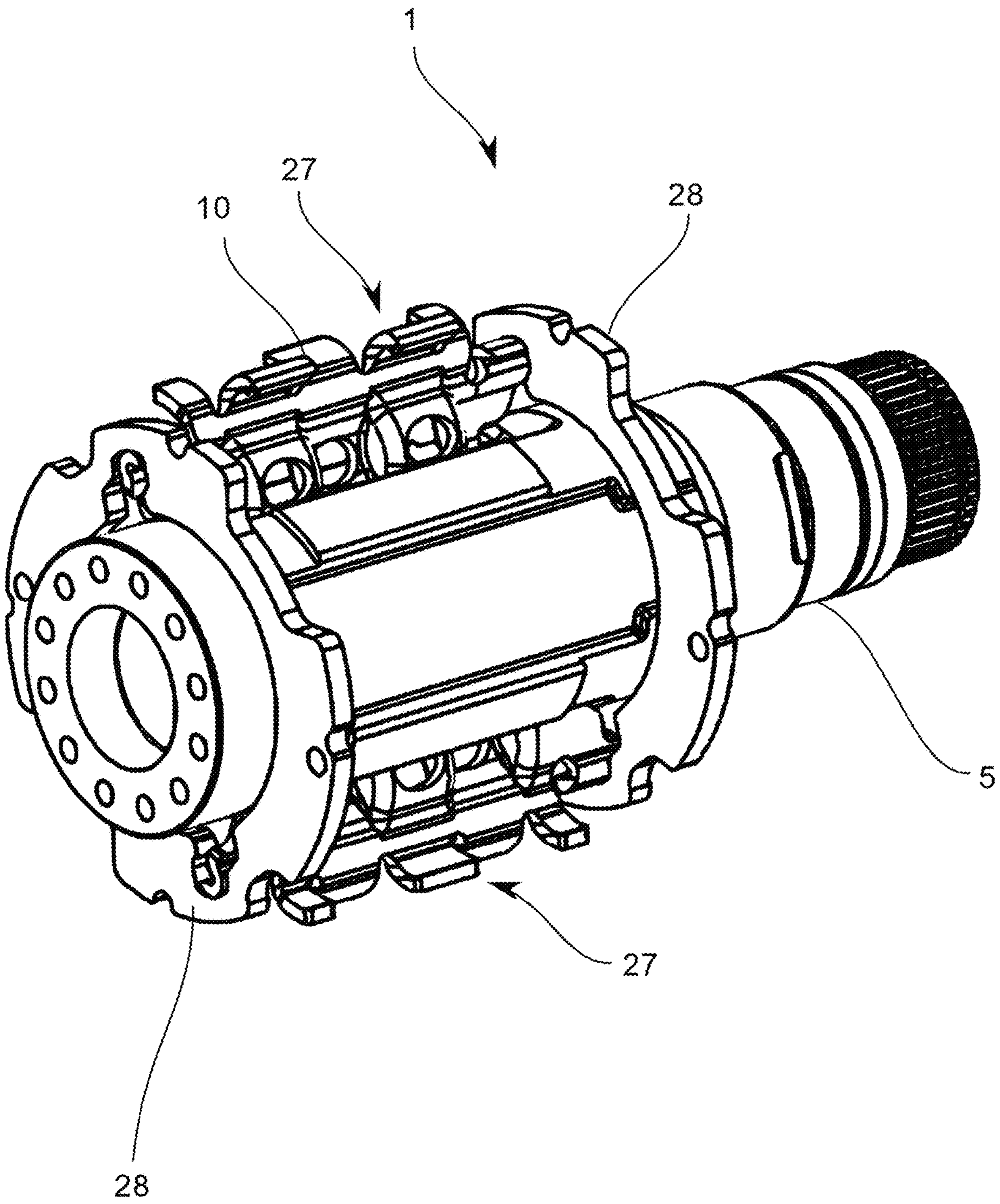
Figure 14:
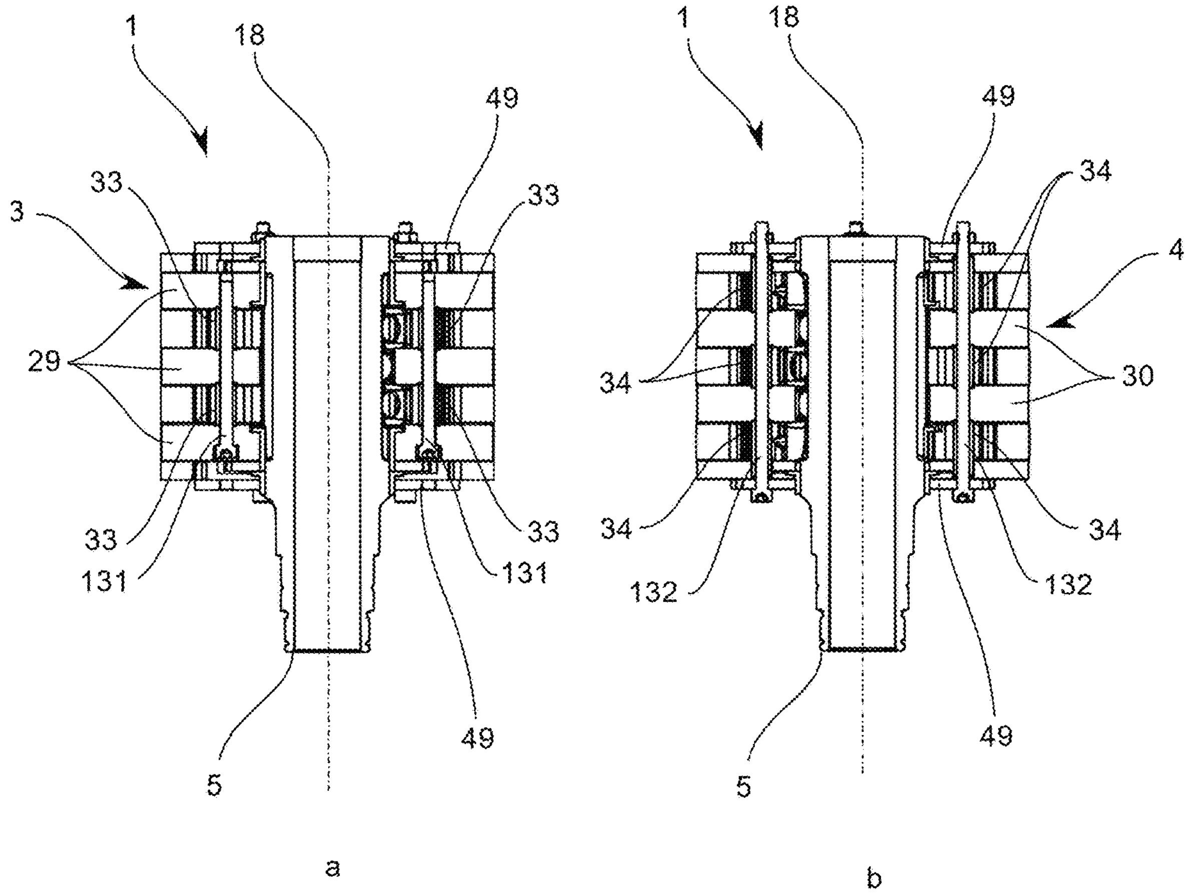

FIG. 8 shows an electric machine in a schematic sectional view,

FIG. 9 shows a rotor in a perspective axial sectional view,

FIG. 10 shows four operating positions of the lever element, each in a cross-sectional detailed view, FIG. 11 shows a lever element in two perspective views, each of which is isolated, FIG. 12 shows two cross-sectional views of the rotor, FIG. 13 shows a rotor with isolated lever elements and securing rings in a perspective view, FIG. 14 shows two axial sectional views through the rotor.

DETAILED DESCRIPTION

Figure 1:
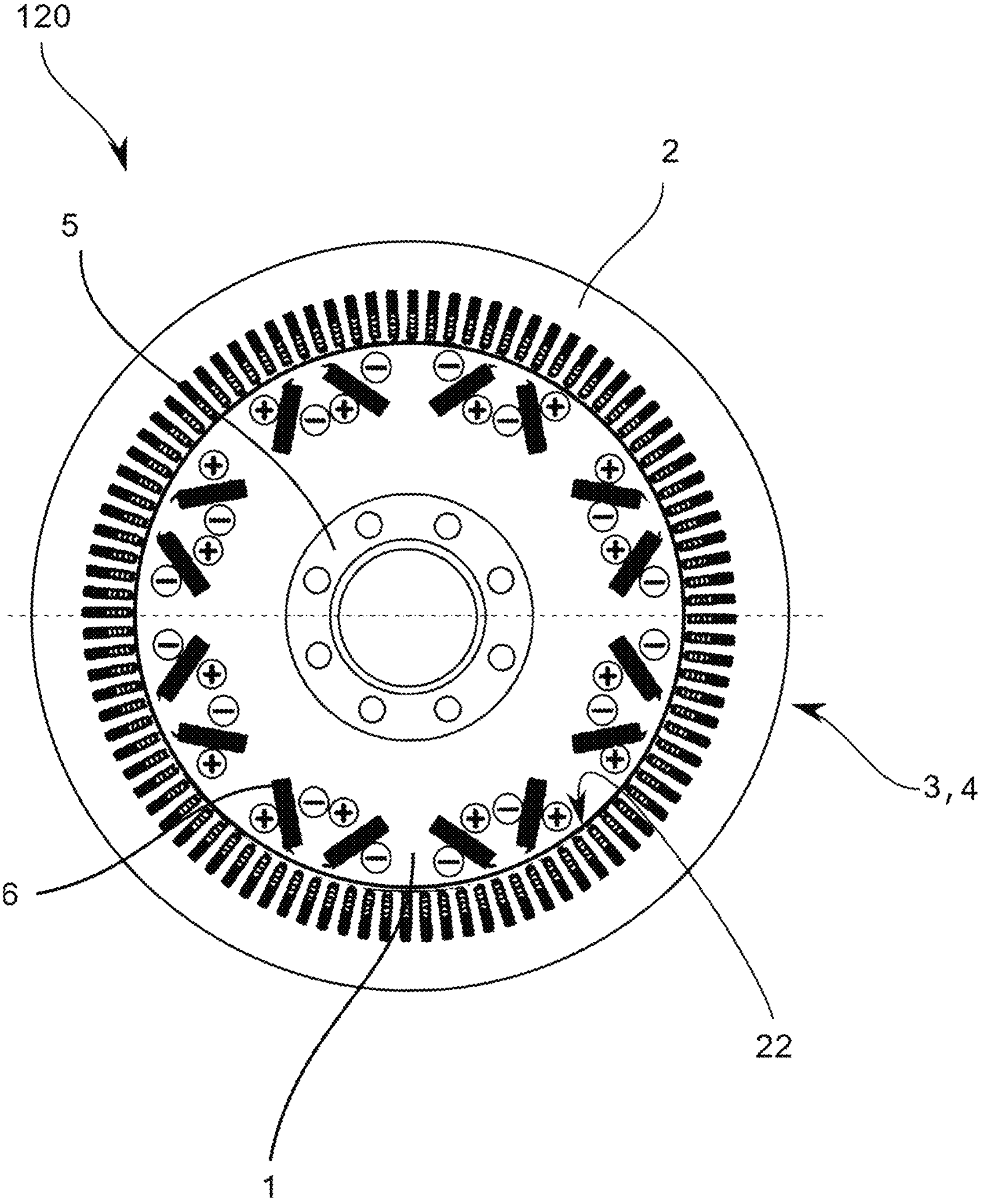

FIG. 1 shows an electric machine 120 configured as a radial flow machine, in particular for use within a drive train of a hybrid or fully electrically powered motor vehicle, comprising a stator 2 and a rotor 1 separated from stator 2 by an air gap 22.

The rotor 1 comprises at least a first rotor body 3 with a first group of permanent magnets 6 and a second rotor body 4 with a second group of permanent magnets 61. This is particularly clear from FIGS. 2-7, which show the two rotor bodies 3, 4. The two rotor bodies 3, 4 are essentially formed from identical rotor laminations, wherein the position and the number of the permanent magnets 6 of the first group and the number of permanent magnets 61 of the second group in the rotor bodies 3, 4 are identical.

The first rotor body 3 and the second rotor body 4 can be rotated relative to one another about a common axis of rotation 119 by means of a mechanical field-attenuation mechanism 7 against the effect of a first torsional stiffness 8.

The field-attenuation mechanism 7 comprises a lever element 10 which can be pivoted about a pivot point, wherein the first rotor body 3 can be coupled to a first lever section 31 and the second rotor body 4 to a second lever section 32 of the lever element 10 and the first lever section 31 and the second lever section 32 are arranged on opposite sides of the lever 10, so that the first rotor body 3 and the second rotor body 4 can be rotated relative to one another by tilting the lever element 10 for a desired movement of the mechanical field-attenuation mechanism 7, which can also be clearly seen from the combination of FIGS. 2-4 and which will be explained in more detail below.

The field-attenuation mechanism 7 uses the lever element 10 at at least two circumferential locations of the rotor bodies 3, 4 within the rotor 1, also referred to as lever contact sections 12, 13, 15, 16, for transmitting the partial moments of the two rotor bodies 3, 4 to the rotor shaft 5 while simultaneously providing a torsional stiffness 8 between the rotor bodies 3, 4, which can also be clearly seen from the block diagrams in FIGS. 2-4. The lever element 10 has three regions at different distances from the axis of rotation 119 of the rotor 1, in which it is in contact with the two rotor bodies 3, 4 as the two inputs for the torque and the rotor shaft 5 as the output for the torque. The three regions of the lever element 10 are the first lever section 31, the second lever section 32, and the unspecified contact section at the radially inner end of the lever element 10 to the rotor shaft 5.

Via these defined contact regions of the first and second lever sections 31, 32, the partial moments of the two rotor bodies 3, 4 act on the lever element 10 via the lever contact sections 12, 13, 15, 16 in such a way that the sum is transmitted to the rotor shaft 5 via the unspecified contact section at the radially inner end of the lever element 10 and at the same time, by tilting the lever element 10, the two rotor bodies 3, 4 are rotated via the lever contact sections 12, 13, 15, 16 against the torsional stiffness 8 that prevails between them into the position with full magnetic field with aligned magnetic poles, as shown in FIGS. 3-4. With the lever element 10, the partial moments, which actually point in the wrong direction for this process, are converted into the target direction.

The torsional stiffness 8 is symbolically shown in FIGS. 2-4 with compression springs, which are located, for example, in spring windows of both rotor bodies 3, 4. However, the torsional stiffness 8 can also be formed in any other known way.

FIG. 2 shows the field-attenuation mechanism 7 initially in its neutral position. The field-attenuation mechanism 7 is in a field-weakened position, with the magnetic poles of the first group of permanent magnets 6 not aligned with the second group of permanent magnets 61, which can be easily understood from the rotational angle position of the two rotor bodies 3, 4 in FIG. 2. In this case, the total torque is lower than a minimum torque that is required to allow the rotor bodies 3, 4 to begin to move relative to one another against the possibly biased torsional stiffness 8. The characteristic curve of the torsional stiffness 8 is selected such that when a specified minimum torque is exceeded, the field-attenuation mechanism 7 begins to move from the maximum field-weakened position and when a specified higher torque is reached and exceeded, the full movement to the position with full magnetic field has been completed, as is shown, for example, for a motor operation of the electric machine 120 in FIG. 3.

The first partial torque M1 is transmitted via the lever contact sections 12, 13 of the first rotor body 3 depending on the direction of the total torque, wherein the first lever contact section 12 of the first rotor body 3 is arranged to be radially inwardly offset from the second lever contact section 13. Analogously, the second partial torque M2 of the second rotor body 4 is transmitted to the lever element 10 via the lever contact sections 15, 16, depending on the direction of the total torque. The first lever contact section 15 of the second rotor body 4 is arranged to be radially inwardly offset from the second lever contact section 16.

If the direction of the total torque changes, for example by changing from a motor to a generator operation of the electric machine 120, the lever sections 31, 32 of the lever element 10 can change sides and in both operating states the identical relative rotation takes place between the rotor bodies 3, 4 to generate a weakened or full magnetic field, as shown in FIGS. 3-4.

In FIG. 3, the mechanical field-attenuation mechanism 7 is in an operating position with full magnetic field with aligned magnetic poles of the permanent magnets 6, 61 and the lever element 10 in a tilted extreme position. In this case, for example, a total torque when driving in motor operation is greater than a minimum torque for the entire movement against the torsional stiffness 8.

FIG. 4 shows the mechanical field-attenuation mechanism 7 in position with full magnetic field with aligned magnetic poles of the permanent magnets 6, 61 and the lever element 10 in an oppositely tilted extreme position with oppositely acting torque. In this case, for example, a total torque during recuperation in generator mode of the electric machine 120 is greater than a minimum torque for the entire movement against the torsional stiffness 8.

As can be seen from FIGS. 5-7, which outline a possible design of the principle shown in FIGS. 2-4, the rotor shaft 5 is coupled coaxially within the first rotor body 3 and the second rotor body 4 via the lever element 10 in a torque-transmitting manner to the first rotor body 3 and the second rotor body 4, wherein the lever element 10 is pivotably arranged on the rotor shaft 5.

As shown in FIGS. 5-7, the lever element 10 extends in the radial direction into a first lever window 11 of the first rotor body 3 shown in a partial sectional view, wherein the first lever window 11 has a first lever contact section 12 and a second lever contact section 13 radially spaced apart therefrom, which is indicated by a solid line. The lever element 10 further extends in the radial direction into a second lever window 14 of the second rotor body 3. This second lever window 14 has a first lever contact section 15 and a second lever contact section 16 radially spaced apart therefrom, which is shown by a dashed line. In a first operating position 117 which is shown in FIG. 7, the lever element 10 rests on the first lever contact section 12 of the first lever window 11 and on the second lever contact section 16 of the second lever window 14, and in a second operating position 118 which is shown in FIG. 6, on the second lever contact section 13 of the first lever window 11 and on the first lever contact section 15 of the second lever window 14.

The first lever contact section 12 is arranged to be radially below the second lever contact section 13 of the first lever window 11 and the first lever contact section 15 is arranged to be radially below the second lever contact section 16 of the second lever window 14. At the first lever contact section 12 of the first lever window 11 and at the first lever contact section 15 of the second lever window 14, a larger torque is transmitted via the first lever element 10 than at the second lever contact section 13 of the first lever window 11 and the second lever contact section 16 of the second lever window 14.

The torsional stiffness 8 is designed as a spring element in FIGS. 5-7, in particular as a compression spring or arc spring, the characteristic curve of which has a bias moment. Here, too, the characteristic curve of the torsional stiffness 8 is selected such that when a specified minimum torque is exceeded, the first rotor body 3 and the second rotor body 4 begin to rotate relative to one another from a position with maximum field attenuation and, when a specified maximum torque is reached and/or exceeded, they have completed a rotation relative to one another into a position with full magnetic field.

In FIGS. 5-7, the field-attenuation mechanism 7 has two opposing, essentially identical lever elements 10, each of which is arranged so as to be pivotable and distributed over the circumference of the rotor shaft 5.

FIG. 8 shows an electric machine 120, in particular for use within a drive train of a hybrid or fully electric motor vehicle, comprising a stator 2 and a rotor 1 separated from stator 2 by an air gap 22. The rotor 1 has a first rotor body 3 with a first group of permanent magnets 6 and a second rotor body 4 with a second group of permanent magnets 61, which is axially spaced apart from the first rotor body 3, as can be clearly seen from FIG. 9.

Within the first rotor body 3 and the second rotor body 4, a rotor shaft 5 is coaxially coupled to the first rotor body 3 and the second rotor body 4 in a torque-transmitting manner. The first rotor body 3 is rotatably mounted on the rotor shaft 5 relative to the second rotor body 4 by means of a mechanical field-attenuation mechanism 7, counter to the effect of a first torsional stiffness 8, which is designed as a compression spring or arc spring. To transmit the partial moments of the two rotor bodies 3, 4 to the rotor shaft 5, a lever element 10 is used at at least two circumferential points within the rotor 1, with the simultaneous effect of the torsional stiffness 8 between the rotor bodies 3, 4. The mechanical field-attenuation mechanism 7 is explained in more detail below with reference to FIG. 10.

It can be seen from FIG. 10 that the contours 17 of the lever element 10 which are in contact with the lever contact sections 12, 13, 15, 16 are designed such that in each operating position of the mechanical field-attenuation mechanism 7 over its entire movement path in sections perpendicular to the rotational axis 18 of the rotor 1, all contact points 19, 20, 21 between the rotor bodies 3, 4 and the lever element 10 are arranged on a straight connecting line 23 between the tilting axis 24 of the lever element 10 and the rotational axis 18 of the rotor 1.

The lever element 10 comprising an ovoid base body 26 is received in a V-shaped groove 25 directed radially inward and extending axially through the rotor shaft 5. The ovoid, i.e., egg-shaped, shape of the base body 26 can also be clearly seen in FIG. 4. The ovoid base body 26 rolls in the V-shaped groove 25 during operation of the mechanical field-attenuation mechanism 7. To illustrate this kinematics, FIG. 3 shows four operating positions of the lever element 10, wherein the rotor shaft 5 moves counterclockwise relative to the rotor body 3. For better visibility of the kinematic process during the movement of the field-attenuation mechanism 7, the reference symbols in the images marked b, c, d in FIG. 11 have been omitted.

It can be clearly seen from the illustrations in FIG. 11 that the corresponding design of the lever element 10, the lever contact sections 12, 13, 15, 16, and the V-shaped groove 25 result in a slip-free contact between the lever element 10, the rotor bodies 3, 4, and the rotor shaft 5. The lever element 10, the lever contact sections 12, 13, 15, 16 and the V-shaped groove are geometrically designed in such a way that their contours roll on one another during the tilting of the lever element 10 about a tilting axis 24 and the rotation of the rotor bodies 3, 4 or the rotor shaft 5 about the rotational axis 18 of the rotor 1.

For this purpose, the contours 17 of the lever element 10 are designed in such a way that in every position of the mechanical field-attenuation mechanism over the entire intended movement, viewed in sections perpendicular to the rotational axis 18, all contact points 19, 20, 21 between the rotor bodies 3, 4 and the lever element 10 lie on a straight connecting line 23 between the tilting axis 24 of the lever element 10 and the rotational axis 18 of the rotor 1.

The lever element thus has three contact regions radially spaced apart from one another by the contact points 19, 20, 21, which are located at different distances from the axis of rotation 18 of the rotor 1, with which it is in axial contact with the two rotor bodies 3, 4 as the two inputs for the torque and the rotor shaft 5 as the output for the torque.

The partial moments of the two rotor bodies 3, 4 act on the lever element 10 via the defined contact regions of the contact points 20, 21 in such a way that the sum is transferred to the rotor shaft 5 via the contact region of the contact point 19 and at the same time, by tilting the lever element, the two rotor bodies 3, 4 are rotated against the torsional stiffness 8 that prevails between them into the position with full magnetic field with aligned magnetic poles of the permanent magnets 6, 61, which can be easily understood from the various operating positions as shown in FIG. 11.

With the lever element 10, the partial moments, which actually point in the wrong direction for this process, are converted into the target direction. The decisive factor here is that the larger of the two partial moments, which determines the direction of the total moment, acts radially further inside the lever element than the smaller of the two partial moments.

The rotor bodies 3, 4 offer lever contact sections 12, 13, 15, 16 at both distances to the rotational axis 18 for contact with the lever element 10 at the contact points 20, 21, which can be clearly seen in FIG. 5. If the direction of the total torque changes during motor and generator operation, the contact of the contact points 20, 21 on the lever element 10 can change sides and in both operating states the identical relative rotation takes place between the rotor bodies 4, 4 to generate a weakened or full magnetic field.

The characteristic curve of the torsional stiffness 8 is selected such that when a specified minimum torque is exceeded, the mechanical field-attenuation mechanism 7 begins to move from the position with the magnetic field at its maximum weakened level, and when a specified higher torque is reached and exceeded, the entire movement to the position with the full magnetic field is completed. The characteristic curve for the torsional stiffness 8 can have a bias moment for this purpose.

The lever element 10, in its non-tilted neutral position, which is shown in the illustration a of FIG. 10, forms a stop for the position with a maximally weakened magnetic field with its then bilateral contacts at the contact points 20, 21 to the rotor bodies 3, 4 at their lever contact sections 12, 13, 15, 16 against a magnetic repulsion moment between the rotor bodies 3, 4 and against a bias moment of the torsional stiffness 8. As shown in FIG. 5, stop teeth 35, 36 acting in the circumferential direction are formed between the rotor discs 29, 30 of the rotor bodies 3, 4 and the rotor shaft 5, which define the rotary end positions of the rotor shaft relative to the rotor discs 29, 30 or the rotor bodies 3, 4. If the torque for this position is exceeded, the lever mechanism is bypassed by means of the stop gears and the increased torque is transmitted directly from the rotor bodies 3, 4 to the rotor shaft 5.

The lever element 10 is shown in two isolated perspective views in FIG. 11. It can be clearly seen from these illustrations that arcuate claws 27 extending radially outwards are formed on the ovoid base body 26 for engagement with the radially outer lever contact sections 13, 16. The circumferential orientations of the arcuate claws 27 alternate in the axial direction. The base body 26 is hollow and also has convex arc sections 38, 39 arranged alternately in the axial direction, wherein one group of arc sections 38 is assigned to the first rotor body 3 and the other group of arc sections 39 is assigned to the second rotor body 4.

The radially inner contact point 19 with the lever contact section 12, 15 of the rotor bodies 3, 4 is located on the radially inner contact surfaces 41, 42 of the arc sections 38, 39 of the lever element 10. The radially outer contact surfaces 43, 44 on the arcuate claws 27 of the lever element 10 provide the contact point 21 with the rotor bodies 3, 4. Radially therebetween, the contact surfaces 45, 46 are formed on the ovoid base body 26, which form the contact point 20 with the rotor bodies 3, 4. This can be clearly seen again when comparing FIG. 4 with FIG. 10.

The claws 27 as well as a section of the ovoid base body 26 engage radially in pockets 37 provided for this purpose in the rotor bodies 3, 4 to make contact therewith, which can be particularly clearly understood from FIG. 12. The pockets 37 have a mushroom cloud-like contour with opening shoulders 47 directed inwards on the radially inner section. The lever contact section 12, 15 of the rotor bodies 3, 4 is formed on these opening shoulders 47 of the pockets 37. The radially outer lever contact sections 13, 16 are formed in the pockets 37.

The lever element 10 is secured radially by a securing ring 28 which can be rotated relative to and coaxially with the rotor 1, as shown in FIG. 13. This supports the centrifugal force of the lever element 10 in the rotor 1 and secures its radial position. To minimize friction at the support points, the contours of the contacting surfaces between the lever element 10 and the securing ring 28 can also be designed so that they roll against each other. For this purpose are provided the axially outer claws of the lever element 10, which are not designated in more detail, which have a design that differs from the claws 27, which can also be clearly seen in FIG. 11. These axially outer claws, which are not further designated, engage in pockets provided for this purpose in the securing rings 28.

The first rotor body 3 consists of a plurality of rotor discs 29, which are arranged in the axial direction alternating with rotor discs 30 of the second rotor body 4. The rotor discs 29 of the first rotor body 3 are connected to form a structural unit via first connecting means 131 extending axially in parallel to the rotational axis 18 of the rotor 1, and the rotor discs 30 of the second rotor body 4 are connected to form a structural unit via second connecting means 132 extending axially in parallel to the rotational axis 18 of the rotor 1, which can be clearly seen from FIG. 14. A spacer sleeve 33 is arranged on the first connecting means 131 between adjacent rotor discs 29 of the first rotor body 3, and a spacer sleeve 34 is arranged on the second connecting means 132 between adjacent rotor discs 30 of the second rotor body 4.

The connecting means 131, 132 carry guide elements 48 for one end of a torsional stiffness 8 acting in the circumferential direction on associated spacer sleeves 33, 34. The other end of the rotor rests in an unspecified recess of the respective rotor disc of the rotor body 3, 4. Via the torsional stiffness 8, the guide elements 48, the spacer sleeves 33, 34, and finally the connecting means 131, 132, a torsional stiffness 8 is formed from both rotor bodies 3, 4 to the respective other rotor body 3, 4, preferably in such a way that the two torsional stiffnesses 8 interact in a parallel circuit in the direction of the relative rotation, which means a stronger magnetic field. The two rotor bodies 3, 4 are each mounted on the front rotor discs with rolling or plain bearings on the rotor shaft 5. The rotor 1 can be balanced on two front-side balancing discs 49, which are part of the first rotor body 3

The disclosure is not limited to the embodiments shown in the drawings. The above description is therefore not to be regarded as limiting, but rather as illustrative. The following claims are to be understood as meaning that a stated feature is present in at least one embodiment of the disclosure. This does not exclude the presence of further features. Where the claims and the above description define 'first' and 'second' features, this designation serves to distinguish between two features of the same type without defining an order of precedence.

LIST OF REFERENCE SYMBOLS

1 Rotor
2 Stator
3 Rotor body
4 Rotor body
5 Rotor shaft
6 Permanent magnet
7 Field-attenuation mechanism
8 Torsional stiffness
10 Lever element
11 Lever window
12 Lever contact section
13 Lever contact section
14 Second lever window
15 Lever contact section
16 Lever contact section
17 Contour
18 Rotational axis
19 Contact point
20 Contact point
21 Contact point
22 Air gap
23 Connecting line
24 Tilting axis
25 Groove
26 Main body
27 Claws
28 Securing ring
29 Rotor discs
30 Rotor discs
31 First lever section
32 Second lever section
33 Spacer sleeve
34 Spacer sleeve
35 Stop teeth
36 Stop teeth
37 Pockets
38 Arc section
39 Arc section
41 Contact surface
42 Contact surface
43 Contact surface
44 Contact surface
45 Contact surface
46 Contact surface
47 Opening shoulder
48 Guide element
49 Balancing disc
61 Permanent magnet
117 Operating position
118 Operating position
119 Axis of rotation
120 Electric machine
131 Connecting means
132 Connecting means

The invention claimed is:

1. An electric machine, comprising: a stator and a rotor separated from the stator by an air gap, the rotor comprising at least a first rotor body having a first group of permanent magnets and at least one second rotor body axially spaced apart from the first rotor body having a second group of permanent magnets, and a rotor shaft being coupled coaxially within the first rotor body and the second rotor body in a torque-transmitting manner to the first rotor body and the second rotor body, at least the first rotor body being rotatably mounted on the rotor shaft by a mechanical field-attenuation mechanism against an effect of a first torsional stiffness relative to the second rotor body, wherein:

contours of a lever element in contact with lever contact sections are designed such that in each operating position of the mechanical field-attenuation mechanism over its entire movement path in sections perpendicular to an axis of rotation of the rotor, all contact points between rotor bodies and the lever element are arranged on a straight connecting line between a tilting axis of the lever element and the rotational axis of the rotor.

2. The electric machine according to claim 1, wherein: the torsional stiffness is designed as a spring element.

3. The electric machine according to claim 1, wherein: the lever element is received in a radially inwardly directed groove extending axially through the rotor shaft.

4. The electric machine according to claim 3, wherein: the groove is V-shaped.

5. The electric machine according to claim 3, wherein: the lever element comprises an ovoid base body which is positioned in the groove.

6. The electric machine according to claim 5, wherein: arcuate claws extending radially outward from the ovoid base body are formed for engagement with the lever contact sections.

7. The electric machine according to claim 1, wherein: the lever element is secured radially by a securing ring which can be rotated relative to and coaxially to the rotor.

8. The electric machine according to claim 1, wherein: the first rotor body comprises a plurality of rotor discs which are arranged in the axial direction alternating with rotor discs of the second rotor body, wherein the rotor discs of the first rotor body are connected to form a structural unit via first connecting means extending axially parallel to the axis of rotation of the rotor, and the rotor discs of the second rotor body are connected to form a structural unit via second connecting means extending axially parallel to the axis of rotation of the rotor.

9. The electric machine according to claim 8, wherein: a spacer sleeve is arranged between adjacent rotor discs of the first rotor body on the first connecting means and a spacer sleeve is arranged between adjacent rotor discs of the second rotor body on the second connecting means.

10. The electric machine according to claim 8, wherein: stop teeth acting in a circumferential direction are formed between the rotor discs of the rotor body and the rotor shaft.

11. The electric machine according to claim 1, wherein the torsional stiffness is designed as a compression spring or arc spring.

* * * * *